US006456424B1

(12) United States Patent
Arbore et al.

(10) Patent No.: US 6,456,424 B1
(45) Date of Patent: Sep. 24, 2002

(54) NOISE SUPPRESSION USING PUMP-RESONANT OPTICAL PARAMETRIC OSCILLATION

(75) Inventors: Mark A. Arbore; Jeffrey D. Kmetec, both of Palo Alto, CA (US)

(73) Assignee: Lightwave Electronics Corporation, Mountain View, CA (US)

( * ) Notice: Subject to any disclaimer, the term of this patent is extended or adjusted under 35 U.S.C. 154(b) by 0 days.

(21) Appl. No.: 09/574,585

(22) Filed: May 17, 2000

(51) Int. Cl.⁷ .................................................. G02F 1/39
(52) U.S. Cl. ........................................ 359/330; 372/22
(58) Field of Search ................................ 359/326–332; 372/21–22

(56) References Cited

U.S. PATENT DOCUMENTS

| | | | |
|---|---|---|---|
| 3,977,771 A | 8/1976 | Horner | 359/559 |
| 4,093,353 A | 6/1978 | Lang | 359/243 |
| 4,633,475 A | 12/1986 | Harter et al. | 372/25 |
| 4,723,248 A | 2/1988 | Harter et al. | 372/25 |
| 4,951,286 A | 8/1990 | Kimble et al. | 372/21 |
| 5,080,469 A | 1/1992 | McCahon et al. | 359/241 |
| 5,134,622 A | 7/1992 | Deacon | 372/21 |
| 5,153,425 A | 10/1992 | Meinzer et al. | 250/216 |
| 5,377,219 A | * 12/1994 | Geiger | 359/330 X |
| 5,991,318 A | * 11/1999 | Caprara et al. | 372/22 |
| 5,999,547 A | * 12/1999 | Schneider et al. | 372/21 |
| 6,167,068 A | * 12/2000 | Caprara et al. | 372/22 |

OTHER PUBLICATIONS

"Nonlinear Optical Effects: An Optical Power Limiter", A.E. Siegman, Applied Optics, 1 No. 6 p. 739–44, Nov., 1962.
"Quantum Noise and Squeezing in an Optical Parametric Oscillator with Arbitrary Output–Mirror Coupling", B.S. Abbott, S. Prasad, Physical Review A, 45 No. 7 p. 5039–51, Apr. 1, 1992.
"Quantum Noise Reduction using an Optical Parametric Oscillator", C. Fabre, E. Giacobino, S. Reynaud, T. Debuisschert, Proceedings of the SPIE—The International Society for Optical Engineering, 701 p. 488–93, 1987.
"Observation of Quantum Noise Reduction on Twin Laser Beams", A. Heidmann, R.J. Horowicz, S. Reynaud, E. Giacobino, C. Fabre, G. Camy, Physical Review Letters, 59 No. 22 p. 2555–7, Nov. 30, 1987.
"Observation of Large Quantum Noise Reduction Using an Optical Parametric Oscillator", T. Debuisschert, S. Reynaud, A. Heidmann, E. Giacobino, C. Fabre, Quantum Optics, 1 No. 1 p. 3–9, Sep. 1989.

* cited by examiner

Primary Examiner—John D. Lee
(74) Attorney, Agent, or Firm—Lumen Intellectual Property Services, Inc.

(57) ABSTRACT

A pump resonant optical parametric oscillator (PROPO) is optimized for noise suppression of pump radiation of wavelength $\lambda_p$. The PROPO generally comprises a parametric amplifier disposed within a resonant cavity having input and output couplers. The parametric amplifier has a gain G that increases with increasing power at a pump wavelength $\lambda_p$. The cavity resonates at both pump wavelength $\lambda_p$ and signal wavelength $\lambda_s$. The parametric amplifier transfers noise on the pump radiation to the signal radiation. Input coupler transmission $T_{IC}$, output coupler pump transmission $T_P$, signal transmission $T_S$, and gain G are chosen such that a resonated pump power at $\lambda_p$ is nearly clamped at a threshold level. By setting these parameters such that the PROPO has a threshold slightly lower than the available power at a wavelength of the optical pump, noise on the pump radiation may be reduced by greater than about a factor of 10. The same principle may be applied to a PROPO having two parametric amplifiers to suppress noise on a signal radiation.

36 Claims, 6 Drawing Sheets

NOISE SUPPRESSION USING PUMP-RESONANT OPTICAL PARAMETRIC OSCILLATION

STATEMENT REGARDING FEDERALLY SPONSORED RESEARCH OR DEVELOPMENT

This invention was supported in part by grant number NSF PHY-9210038 from the National Science Foundation (NSF). The Government has certain rights in the invention.

FIELD OF THE INVENTION

This invention relates generally to nonlinear optics. More particularly, it relates to noise suppression in optical parametric oscillators.

BACKGROUND ART

Optical Parametric Oscillators (OPOs) generally comprise a nonlinear material disposed within a resonant cavity. OPOs convert incident photons into photon pairs when optically excited at a power per unit area above a certain threshold. The threshold level is a characteristic of the nonlinear material and the resonator. A source such as a laser provides the incident photons in the form of pump radiation. OPOs and lasers are often subject to noise. Noise may arise in the pump source or in the current source that drives the pump source. If there is noise on the pump source there will also be noise on the resonated pump or signal within the OPO. Noise may also arise due to environmental acoustic sources or temperature fluctuations. Types of noise include white noise, 1/f noise and narrow band noise. Such noise is undesirable in many applications such as precision measurements, analog signal transmission and analog signal processing.

Prior art noise suppression techniques often depend on the frequency range in which the noise is to be suppressed. For example, high frequency noise may be suppressed with passive techniques such as mode cleaner cavities. Low frequency noise may be suppressed using active techniques, e.g. involving electronic feedback. Because a laser or an OPO may be subject to both low and high frequency noise, both types of noise suppression must often be used, which adds to the complexity and cost of the system.

OPO's are usually embodied in one of two forms: Either a doubly resonant oscillator (DRO) in which both the generated optical beams are resonated or a singly resonant oscillator (SRO) in which only one of the generated optical beams is in resonance. In a pump resonant OPO (PROPO), the pump radiation resonates within the OPO cavity. A PROPO could be a singly resonant oscillator (SRO) or a doubly resonant oscillator (DRO). PROPOs are desirable because they can operate at a lower threshold than non-pump resonant OPOs. This also helps stabilize the OPO frequency. Furthermore, pump resonant OPOs are usually pumped with single frequency lasers, which are often very quiet.

One such quiet single frequency laser is the non-planar ring oscillator (NPRO). NPRO-based pump-resonant OPO's have been demonstrated in several wavelength ranges. For examples the reader is referred to K. Schneider and S. Schiller, "Narrow-linewidth, pump-enhanced singly-resonant parametric oscillator pumped at 532 nm", Applied Physics B 65, 775, (1997), and K. Schneider, P. Kramper, S. Schiller, and J. Mlynek, "Toward an Optical Synthesizer: A Single Frequency Parametric Oscillator Using PPLN", Opt. Lett. 22, 1293, (1997), and D. Chen, D. Hinkley, J. Pyo, J. Swenson, and R. Fields, "Single-Frequency, Low-threshold continuous-wave 3-$\mu$m Periodically Poled Lithium Niobate Optical Parametric Oscillator."

A. E. Siegman, in "Nonlinear Optical Effects: An Optical Power Limiter", Appl. Opt. Vol 1, 739 (1962) proposed using an OPO to protect against large spikes in laser power, focusing on the large-dynamic-range aspects of the device. As a noise suppressor, the OPO described by Siegman would cut off output power sharply and flatly above a certain threshold. Siegman's analysis a device which was not pump resonant. However, because the ignored pump depletion and gain saturation, Siegman concluded that an OPO was a perfect noise suppresser. In addition, Siegman's analysis did not realistically address optimization of a design to minimize noise in an OPO under actual operating conditions. In effect, Siegman said that pump transmission in an OPO could not exceed the threshold value. As such, an OPO as described by Siegman would only cut off fluctuations of the resonant power level above the threshold, but would not suppress deviations of the resonant power below the threshold. Although later researchers demonstrated OPO operation with an incident pump power exceeding the threshold, none recognized doing noise suppression this way.

There is a need, therefore, for an improved Optical Parametric Oscillator with improved noise suppression.

OBJECTS AND ADVANTAGES

Accordingly, it is a primary object of the present invention to provide an optical parametric oscillator (OPO) having increased suppression of noise at a wavelength of incident pump radiation. It is a further object of the invention to provide a method for optimizing noise suppression of pump radiation in an OPO. It is an additional object of the invention to provide an OPO with increased noise suppression at a wavelength of signal radiation.

SUMMARY

These objects and advantages are attained by a pump resonant optical parametric oscillator (PROPO) operated above threshold for the purpose of noise suppression. The PROPO may be optimized for noise suppression of pump radiation of wavelength $\lambda_p$. The PROPO generally comprises a parametric amplifier disposed within a resonant cavity. The parametric amplifier has a gain G at a signal wavelength $\lambda_s$. The gain G increases monotonically with increasing power at the pump wavelength $\lambda_p$. The resonant cavity resonates at both pump wavelength $\lambda_p$ and signal wavelength $\lambda_s$. The resonant cavity includes an input coupler having a transmission $T_{IC}$ at the pump wavelength $\lambda_p$. The cavity also includes at least one output coupler having a transmission $T_P$ at the pump wavelength. In addition the cavity may include another output coupler (possibly the same one) having a transmission $T_s$ at the signal wavelength. The parametric amplifier transfers noise on the pump radiation to the signal radiation. $T_{IC}$, $T_P$, $T_S$, and G are chosen such that a resonated pump power at $\lambda_p$ is nearly clamped at a threshold level, such that a noise suppression of the pump signal is greater than about a factor of 10.

The noise suppression of the pump radiation may be optimized by an inventive method. According to the method $T_p$, $T_S$ and G are set such that the PROPO has a threshold slightly lower than the available power at a wavelength of the optical pump, thereby enabling noise on the pump radiation to be reduced by greater than about a factor of 10. $T_P$ is typically set to be within about a factor of two of a total passive loss $\alpha_P$ of the cavity. The cavity is typically impedance matched by setting $T_{IC}$ within about a factor of 2 of $T_p+\alpha_p$.

An alternative embodiment of the invention provides a PROPO that is configured to suppress noise on a first signal radiation. The PROPO of the second embodiment generally comprises first and second parametric amplifiers disposed within a resonant cavity. The first parametric amplifier produces a resonant first signal radiation having a wavelength $\lambda_{1s}$ and a first idler radiation in response to pump radiation at $\lambda_p$. The first signal radiation acts as a pump for the second parametric amplifier, whereby the second nonlinear crystal produces the second signal at wavelength $\lambda_{2s}$ and a second idler. The cavity could resonate at both wavelength $\lambda_{1s}$ and wavelength $\lambda_{2s}$. A second cavity containing the second nonlinear element could optionally be used to separately resonate the second signal. Alternatively, two coupled cavities may be used with at least one of the two nonlinear elements shared between the two cavities. One cavity resonates at $\lambda_{1s}$ while the second cavity resonates at $\lambda_{2s}$. Noise on the first signal couples directly to the second signal and idler, thereby reducing noise on the first signal.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

1. Theoretic Considerations

Figure 1:
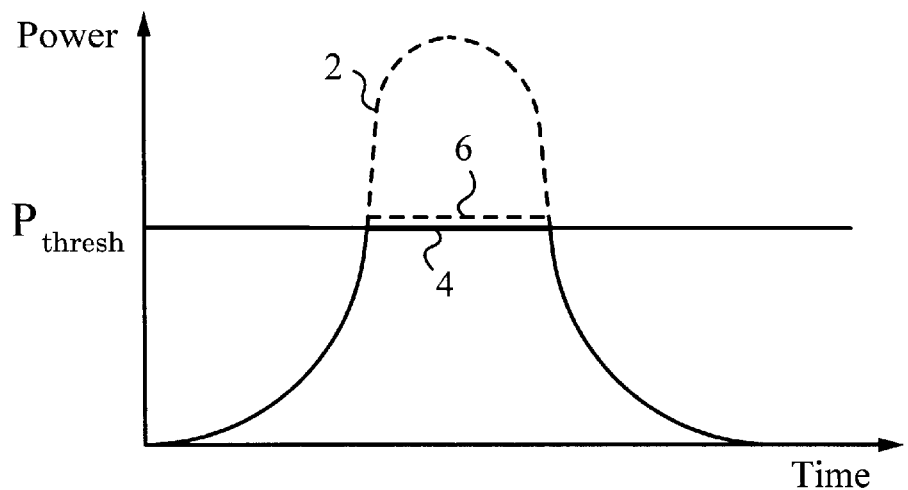
FIG. 1 depicts suppression of optical power spikes in an optical parametric oscillator according to the prior art.

Siegman was concerned with the use of OPO's for suppression of power spikes. An example of power spike suppression using an OPO is illustrated in the power curves of FIG. 1. In FIG. 1 optical power is plotted as a function of time. Without an OPO the incident optical power $P_o$ in a spike typically follows a dashed curve 2. According to the analysis of Siegman, an OPO should ideally cut off all power transmission above a threshold value $P_{thresh}$ resulting in a flat topped solid transmitted power curve 4. Later researchers determined that, even with an OPO, the power transmission slightly exceeds the threshold, as illustrated by the dotted transmitted power curve 6. Siegman did not consider suppression of small fluctuations, e.g. fluctuations of less than about 10% of an average transmitted power. In a typical spike, the incident power $P_o$ is below $P_{thresh}$ at least part of the time. In some spikes the incident power $P_o$ never reaches $P_{thresh}$. Thus, in power spike suppression, the OPO was not operating above threshold all the time. Furthermore, if the power of a power spike does not exceed $P_{thresh}$ there is no suppression at all.

Figure 2:
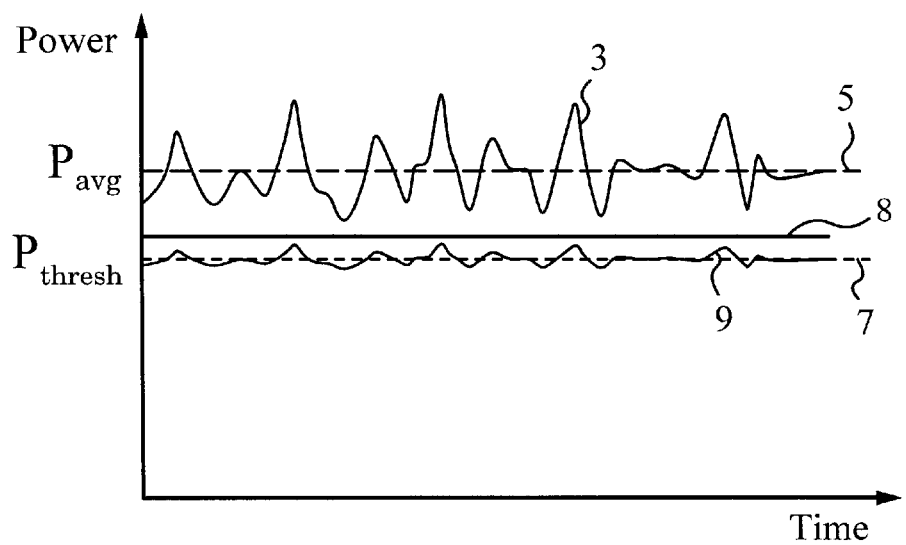
FIG. 2 depicts noise suppression in an optical parametric oscillator according to an embodiment of the present invention.

In embodiments of the present invention, the incident power and OPO parameters are chosen such that the OPO operates above threshold, i.e. $P_o > P_{thresh}$. This is illustrated by FIG. 2 which depicts graphs of optical power versus time. Incident power $P_o$ follows a solid curve 3 which fluctuates about a mean value $P_{avg}$, represented by a dashed line 5. For noise suppression purposes it is desirable to operate the OPO such that fluctuations in the incident power $P_o$ do not dip below the threshold power $P_{thresh}$. Because $P_o$ is above a threshold power $P_{thresh}$, represented by a dotted line 7, the OPO suppresses the fluctuations, i.e. noise on the incident power, producing a transmitted power P that follows a solid curve 9. The transmitted power P slightly exceeds the threshold power $P_{thresh}$ but falls below a power level 8. Thus the transmitted power P is nearly clamped at the threshold power $P_{thresh}$. In FIG. 2 the separation between curves 9 and 8 has been exaggerated for the sake of clarity. In FIG. 2, a pump cavity with no losses other than output coupling and perfect impedance matching have been assumed.

2. Suppression of Pump Noise

Figure 3:
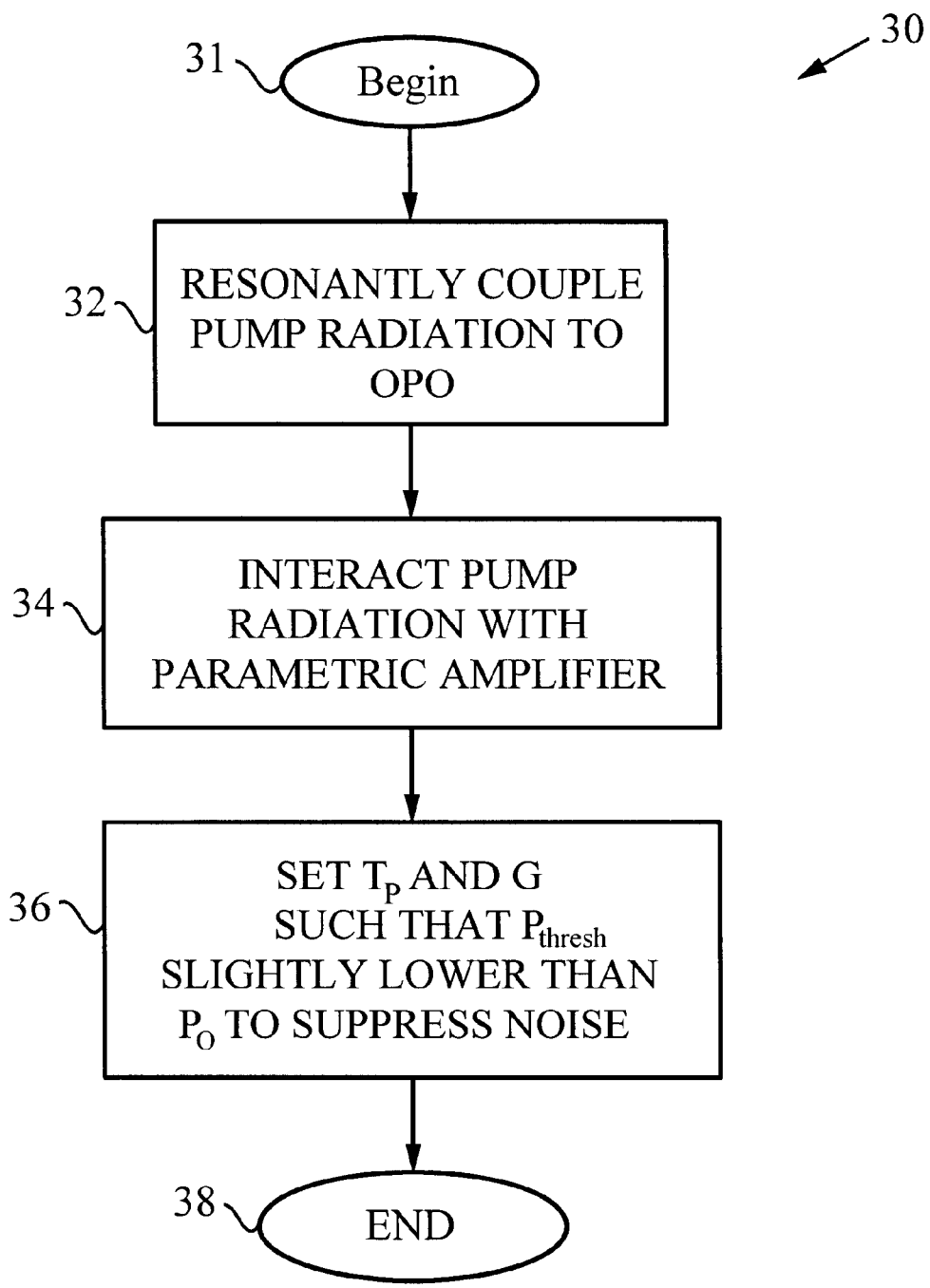
FIG. 3 depicts a flow diagram of a noise suppression method according to a first embodiment of the present invention.

FIG. 3 depicts a flow diagram that summarizes the basic method for noise suppression according to an embodiment of the present invention. The method 30 begins at step 31. Pump radiation at a power $P_o$ resonantly couples to an OPO at step 32. The pump radiation interacts with a parametric amplifier within the OPO at step 34. To suppress noise on the pump radiation, the output coupling $T_p$ and gain G are set such that the threshold power $P_{thresh}$ for the OPO is slightly lower than $P_o$ at step 36. The method ends at step 38.

Figure 4:
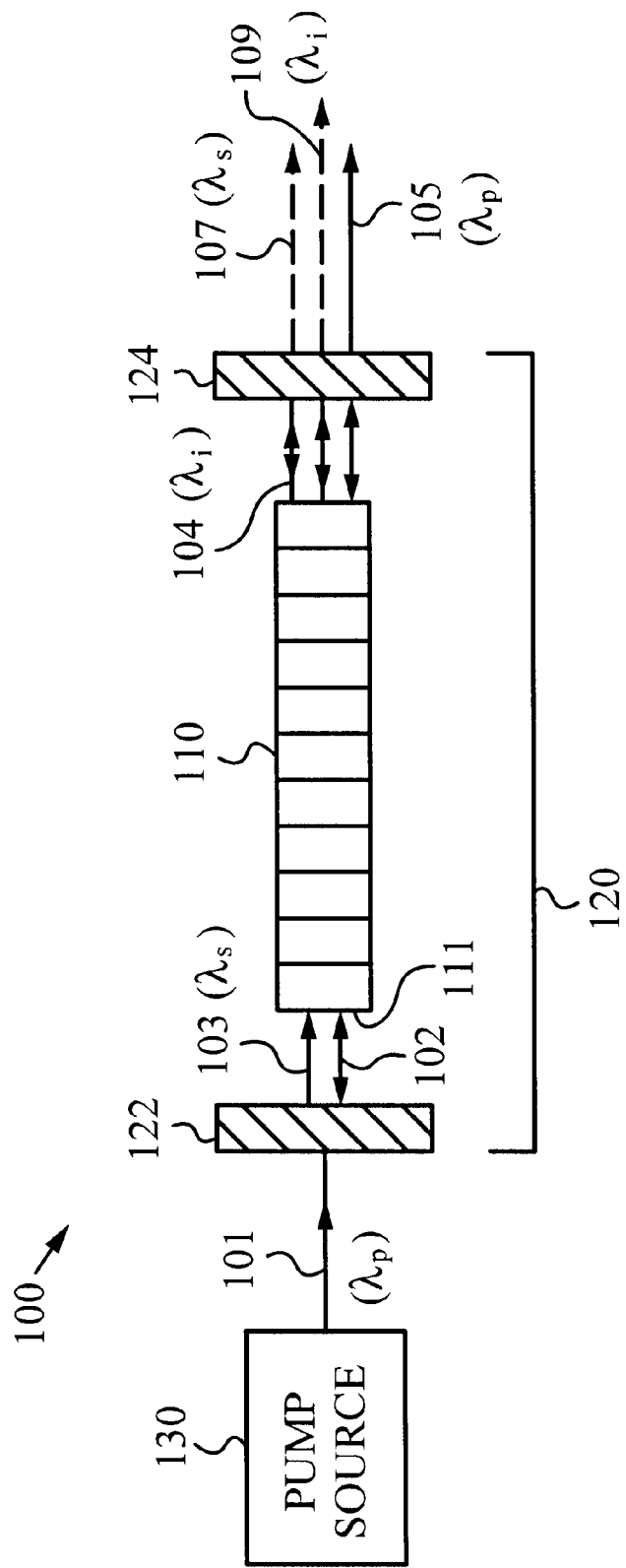
FIG. 4 depicts an optical parametric oscillator according to a second embodiment of the present invention.

FIG. 4. depicts a pump resonant optical parametric oscillator (PROPO) 100 according to an embodiment of the present invention. PROPO 100 generally comprises a parametric amplifier 110 disposed within a resonant cavity 120. Parametric amplifier 110 typically includes a nonlinear medium. Such a nonlinear medium may be a solid, a liquid or a gas. Suitable nonlinear media include crystals such as Lithium Niobate (LiNbO$_3$), Lithium Tantalate (LiTaO$_3$), Lithium Borate (LiBO$_3$), periodically poled lithium niobate (PPLN), periodically poled lithium tantalate (PPLT), MgO:PPLN, KTP, PPKTP, RTA, BBO, or PPRTA. Alternatively, parametric amplifier 110 may include a Raman active or Brillouin active or four-wave mixing medium, which can also produce parametric amplification effects that are nonlinear. Also, one could use a span of optical fiber that exhibits Raman gain, Brillouin gain or four-wave mixing as parametric amplifier 110.

PROPO 100 receives incident pump radiation 101 at a power level $P_0$ from a source 130. For the purposes of this application, radiation and light refer to any form of electromagnetic radiation including microwave, infrared, visible and ultraviolet. Pump radiation 101 is typically in the form of coherent light characterized by a pump wavelength $\lambda_p$. A portion of incident pump radiation 101 resonates within cavity 120 and is referred to as resonant pump radiation 102. A portion of resonant pump radiation 102 interacts with parametric amplifier 110 to produce signal radiation 103 of signal wavelength $\lambda_s$ and an idler radiation 104 of wavelength $\lambda_i$. Signal radiation 103 resonates within cavity 120 and is referred to as resonant signal radiation 103. Preferably, beams of resonant pump radiation 102 and resonant signal radiation 103 overlap in parametric amplifier 110. In general, $\lambda_s$, $\lambda_p$ and $\lambda_i$ are related by $$\frac{1}{\lambda_p} = \frac{1}{\lambda_s} + \frac{1}{\lambda_i} \qquad (1)$$

A portion of resonant pump radiation 102 may exit PROPO 100 as output pump radiation 105. Similarly, a portion of signal radiation 103 may exit cavity 120 as output signal radiation 107 and a portion of signal radiation 103 may be lost to other loss mechanisms, such as absorption.

Both pump radiation 102 and signal radiation 103 resonate within cavity 120. In some applications idler radiation 104 may resonate within cavity 120 as well. The resonant signal radiation 103 generally has a different power immediately after parametric amplifier 110 than immediately before parametric amplifier 110 due to optical gain in parametric amplifier 110. The ratio of resonated signal power $P_{sa}$ measured after nonlinear device 110 to resonated signal power $P_{sb}$ before nonlinear device 110 defines a gain G for amplifier 110 according to $$G = \frac{P_{sa}}{P_{sb}} \qquad (2)$$

In general, G is a function of the nonlinear material comprising amplifier 110, the optical beam sizes and the spatial overlap of the beams containing resonant pump radiation 102 and resonant signal radiation 103, and the resonated pump power $P_p$. Typically, G increases monotonically with increasing resonant pump power $P_p$, however, this is not necessary as long as for the pump power $P_p$ chosen, G increases with $P_p$.

PROPO 100 transfers approximately all pump power above a threshold $P_{thresh}$ from resonant pump radiation 102 to signal radiation 103, idler radiation 104 and losses within cavity 120. By operating source 130 above the threshold, amplifier 110 effectively approximately clamps a power level of resonant pump radiation 102 at the threshold. Consequently, fluctuations in the level of input pump radiation 101 will not significantly affect a level of output pump radiation 105.

Cavity 120 may be any type of cavity structure having two or more mirrors 122, 124. Suitable structures for cavity 120 include Fabry-Perot, triangle, ring and bowtie cavities. Typically one mirror is movable so that the path length L, and therefore resonant frequency, of cavity 120 may be tuned. Resonant cavity 120 is typically configured to resonate at pump wavelength $\lambda_p$ and signal wavelength $\lambda_s$ by appropriate adjustment of length L. Such a configuration optimizes the transfer of power from the resonant pump radiation 102 to the resonant signal radiation 103. The invention is not limited to an OPO having only one cavity which resonates both pump radiation and signal radiation. Those skilled in the art will be able to devise OPO configurations having two or more cavities wherein one cavity resonates the pump radiation and a separate cavity resonates the signal radiation.

Mirrors 122, 124 may be either curved or flat mirrors. Typically a first mirror 122 is partially transmitting and acts as an input coupler. For example, mirror 122, transmits a fraction $T_{IC}$ of incident radiation 101 of wavelength $\lambda_p$. A second mirror 124 may also be partially transmitting and act as an output coupler for any combination of output pump radiation 105, output signal radiation 107 and an output idler radiation 109. For example, output pump radiation 105 leaves cavity 120 through mirror 124. Mirror 124 transmits a fraction $T_P$ of the resonant pump radiation 102 for each round trip of cavity 120. Mirror 124 may also transmit a fraction $T_s$ of the resonant signal radiation 103 for each round trip of cavity 120. In foregoing configuration of cavity 120 the same mirror acts as the output coupler for pump, signal and idler radiation. Other configurations are possible with the present invention. For example, those skilled in the art will be able to devise cavity configurations in which pump, signal and idler radiation exit cavity 120 through separate output couplers, e.g., separate mirrors.

Cavity 120 is typically subject to passive losses that reduce pump radiation 101 by a fraction $\alpha_p$ during each cavity round trip. Furthermore, cavity 120 is typically subject to passive losses $\alpha_s$ at the signal wavelength $\lambda_s$. These passive losses affect the level of resonant pump power that reaches amplifier 110. For example, when PROPO 100 is used for noise suppression and the signal loss $\alpha_s$ is high and predictable, it is desirable to set $T_s$=0. However, to use PROPO 100 as an efficient OPO it is generally not desirable to set $T_s$=0.

Threshold power $P_{thresh}$ is a property of the design of PROPO 100. At threshold the resonant pump power $P_p$ is enhanced by a factor $E=P_p/P_{thresh}$. At the threshold there is typically negligible pump depletion in parametric amplifier 110, and therefore, the resonated pump power only experiences losses due to $T_{IC}$, $T_p$ and $\alpha_p$. If so, resonant enhancement factor E may be shown to be determined by:

$$E = \frac{4T_{IC}}{(T_{IC} + T_p + \alpha_p)^2}. \qquad (3)$$

In noise suppression applications it is often desirable to adjust $T_{IC}/T_p$ and $\alpha_p$ such that $E \geq 10$. For an impedance matched cavity, wherein $T_{IC}=T_p+\alpha_p$, the above equation yields an enhancement at threshold of $$E = \frac{1}{T_p + \alpha_p}. \qquad (4)$$

In the limit of zero pump depletion and small gain for parametric amplifier 110, the parametric gain may be expressed as $$G = gP_p, \qquad (5)$$

where g is a phenomenological factor with units of (Watts)$^{-1}$. The factor g accounts for all geometrical and nonlinear-material related effects of amplifier 110. Equation (5) describes the linear (or unsaturated) amplifier regime. It is linear in that the signal power present at the input of amplifier 110 does not affect the gain. In a steady-state situation, the round trip gain exactly equals the round trip loss. Hence, $$\alpha_s + T_s = gP_p, \text{ or } P_p = (\alpha_s + T_s)/g. \qquad (6)$$

For simplicity we may assume $\alpha_s$=0. If it is not, passive losses at $\lambda_s$ may be incorporated into an overall loss $\gamma_s$ at the signal wavelength $\lambda_s$, where $\gamma_s = \alpha_s + T_s$. Equation (6), shows that the assumptions of entirely unsaturated gain and steady-state operation imply that the resonated pump power is clamped at exactly the power required to balance the losses, i.e., the threshold value $P_p = \gamma_s/g$. Furthermore, this clamped power is independent of the incident pump power $P_0$. This would imply perfect noise suppression, which is the idealized situation described by Siegman. However the effects of pump depletion have not been included in the analysis up to this point.

In general, OPO action alone (including pump depletion) cannot effectively clamp pump power. Instead, the resonant enhancement of resonant pump radiation 102 by amplifier 110 allows depletion to force a "self-consistent" and steady-state solution for the resonant pump power incident on amplifier 110. Furthermore, it should be noted that resonant pump power is generally nearly clamped at an entrance 111 to parametric amplifier 110. If resonant pump radiation 102 varies as it circulates around cavity 120, e.g., due to losses, pump depletion, and/or incident pump light replenishing lost power, then it may not be nearly clamped everywhere. It would therefore be advantageous to sample noise-suppressed resonant pump radiation 102 immediately preceding parametric amplifier 110 rather than at another location within cavity 120.

When considering pump depletion explicitly, thereby allowing for gain saturation, the saturated gain depends on both $P_p$ and $P_s$. In steady-state, equation (6) can be rewritten in the form $$\gamma = gP_p[1 - NL(P_p, P_s)], \qquad (7)$$

where $NL(P_p, P_s)$ describes the saturation of (nonlinear) parametric amplifier 110. An exact expression for $NL(P_p, P_s)$ can be written with Jacobian elliptic integral functions, but not in simple analytic form. However, in the limit of small (but non-negligible) amounts of pump depletion, the saturated gain $G_{sat}$ may be approximated by an unsaturated gain that would be produced by the spatially averaged value of pump power $P_{avg}$ inside parametric amplifier 110. To lowest order, the solution can be written as $$\gamma_s = G_{sat} = gP_p\left[1 - \frac{gP_s\lambda_s}{2\lambda_p}\right]. \qquad (8)$$

Equating the total signal loss $\gamma_s$ with the saturated gain $G_{sat}$ and solving for $P_p$ yields:

$$P_p = \frac{\gamma_s}{g}\left[1 - \frac{gP_s\lambda_s}{2\lambda_p}\right]^{-1}, \qquad (9)$$

Equation (9) may be simplified by noting that that PROPO 100 has an overall efficiency less than 100% and pump depletion is small. The first condition may be expressed as $P_s T_s < P_0$. The second condition may be expressed as $gP_p \approx \gamma_s \approx T_s$. If the resonant enhancement $P_p/P_0$ is significant, it may be implied that $gP_s < (P_0/P_p) < 1$. Thus, equation (9) may be rewritten as:

$$P_p = \frac{\gamma_s}{g}\left[1 + \frac{gP_s\lambda_s}{2\lambda_p}\right]. \qquad (10)$$

Equation (10) shows that above threshold $P_p$ depends linearly on $P_s$, which in turn depends linearly on $P_0$. Therefore, noise on the incident pump power does appear on the resonated pump power, in contrast to the predictions of equation (6) and the conclusion of Siegman.

To continue the analysis, we define an external slope efficiency $\eta$ for PROPO 100 above threshold. We further define $N = P_0/P_{thresh}$ as the "number of times over threshold". The output signal power is related to the resonated signal power $P_s$ by $T_s$. Using these definitions, we can write:

$$P_s = \frac{P_{thresh}(N-1)\eta}{T_s}. \qquad (11)$$

Therefore, $$P_p = \frac{\gamma_s}{g}\left[1 + \frac{gP_{thresh}(N-1)k}{2T_s}\right], \qquad (12)$$

where $k = \eta(\lambda_s/\lambda_p)$, which is typically of order unity. Generally, $k=1$ for a lossless, mode-matched and impedance-matched PROPO, and $k<1$ otherwise. Finally, equation (6) indicates that, for small amounts of pump depletion, the $g/\gamma_s$ may be approximated as $(1/P_p)$. Using this approximation, we may write $g/T_s = (1/P_p)(\gamma_s/T_s)$. This condition occurs, for example, when the pump enhancement is large and/or signal losses are low. Making this substitution for the $g/T_s$ term inside the brackets in equation (12) yields:

$$P_p = \frac{\gamma_s}{g}\left[1 + \frac{P_{thresh}(N-1)k}{2P_p} \cdot \frac{\gamma_s}{T_s}\right] \qquad (13)$$

However, $P_{thresh}/P_p$ is just $1/E$. Equation (13) can therefore be rewritten in terms of either equation (3) or (4). For an impedance matched resonator, equation (4) yields:

$$P_p = \frac{\gamma_s}{g}\left[1 + \frac{(T_p + \alpha_p)(N-1)k}{2} \cdot \frac{\gamma_s}{T_s}\right] \qquad (14)$$

The second term in equation (14) contributes noise to the resonant pump power $P_p$. The relative noise seen on $P_p$ is de-magnified with respect to the relative noise seen on $_o$ by the factor:

$$F = N(T_p + \alpha_p)(k/2)(\gamma_s/T_s), \qquad (15)$$

wherein, in a preferred embodiment, $F \leq 0.5$. We now define a coupling efficiency, $\eta_{coupling} = k(\gamma_s/T_s)$. We also write the total pump loss as $\gamma_p = (T_p + \alpha_p)$. The noise suppression factor F, quantified by Eq. (15), then reduces to $$F = \frac{N\gamma_p \eta_{coupling}}{2} \qquad (16)$$

As $P_o$ increases further above $P_{thresh}$ (i.e. as N increases above unity) the resonant enhancement of pump radiation 101 is reduced, resulting in reduced noise suppression. This behavior can be understood in terms of the resonated signal power $P_s$ increasing in strength. Increased signal power causes more depletion of the pump and more gain saturation, thereby coupling noise on the resonated signal, which follows noise on the incident pump to the resonated pump radiation.

If PROPO 100, operating at steady state, suddenly experiences an increase in incident pump power $P_o$, more pump power couples to cavity 120 resulting in increased $P_p$ and increased gain G. Resonated signal power $P_s$ builds up as does the power of output signal radiation 107. The increased $P_s$ causes additional depletion of $P_p$, which, in turn, reduces the gain G back to the level required for steady state operation. In effect, the noise on the incident pump power appears on the output signal power. The resultant depletion stabilizes the resonated pump power $P_p$.

High frequency noise on the pump is rejected by the resonant cavity for frequencies above the cavity bandwidth, which is approximately 1/cavity-lifetime. Typical bandwidths are of order 10 MHz to 10 GHz. For frequencies near this cutoff frequency, noise on pump power $P_o$ excites "sloshing" of power between the resonated pump wave and the resonated signal wave, much like relaxation oscillations at much lower frequencies in a laser oscillator. Low frequency noise appears mostly on the output signal and idler powers. The above model can accurately analyze amplitude noise at much lower frequencies than the cutoff.

By appropriately optimizing PROPO 100, relative intensity noise (RIN) on resonated pump power $P_p$ may be reduced by a factor of 10 or more compared to RIN on incident pump power $P_o$. The amount of noise suppression depends on the total loss and the value of N. By way of example, consider if PROPO 100 is perfectly mode matched and has total pump losses $\gamma_p$ (including mirror 124) of 1% and operating slightly, e.g. 10%, above threshold (i.e. N=1.1). For perfect impedance matching and perfect mode matching $T_{IC}=1\%$ and $\eta_{coupling}=1$. Losses at signal wavelength $\lambda_s$ are assumed to be negligible compared to signal output coupling. Furthermore, it is implicitly assumed that the magnitude of the noise on $P_o$ is negligible compared to the amount by which PROPO 100 is above threshold, i.e. N is approximately constant even through $P_o$ fluctuates. Equation (16) predicts F=0.0055, implying about 23 dB of noise suppression on $P_p$. This can be considered a realistic scenario for noise suppression using an OPO in accordance with the above embodiment of the present invention.

In a "best case" scenario N=1.01 and the total loss is about 0.1%. The resulting "best case" noise suppression factor F=0.000505 or about 33 dB. In a "worst case" scenario N=10 and the total loss is about 20% the resulting "worst case" noise suppression factor F=1 or 0 dB, i.e., no noise suppression. In an intermediate or "easy" scenario N=2 and the total loss is about 5%. The resulting "easy" noise suppression factor F=0.05 or about 13 dB.

The input and output coupling efficiencies influence the optical throughput of PROPO 100. The input coupling may be determined by spatial mode-matching and impedance-matching. Optimizing these factors theoretically allows for 100% coupling efficiency. Coupling efficiency greater than 90% is achievable in practice. Output coupling efficiency may be expressed as the ratio of output-coupling loss to total cavity loss for the pump wavelength $\lambda_p$. Near threshold, the pump loss due to depletion in parametric amplifier 110 is negligible. Therefore, the optical throughput OT of a mode-matched, impedance matched, near threshold PROPO noise suppresser device is given by $$OT = \frac{T_p}{T_p + \alpha_p}. \quad (17)$$

In the numerical example for the realistic best scenario, passive losses of 0.5%, output coupling of 0.5% and input coupling of 1% would result in a throughput of about 50% while producing 23 dB of noise suppression. The design rules for optimizing an OPO such as PROPO 100 for noise suppression while maintaining an optical throughput of about 50% may be summarized as follows:

1) Minimize losses $\alpha_p$ at the pump wavelength, i.e. $\alpha_p < 5\%$.
2) Set pump output coupling approximately about 1–2 times higher than passive losses ($T_p = \alpha_p$).
3) Set pump input coupling approximately equal to passive losses for impedance matching ($T_{IC}=T_p+\alpha_p$) e.g. within a factor of about 2.
4) Operate slightly above threshold, e.g. N typically greater than about 1.0 and less than about 2.0, preferably greater than about 1.0 and less than about 1.1. The value of N determines the dynamic range of the noise suppression effect. Preferably the OPO should operate as close as possible to threshold, but not so close that fluctuations in the incident pump power $P_o$ dip below $P_{thresh}$. To accomplish this one may set the output coupling at signal wavelength $\lambda_s$, and the parametric amplifier gain g, so that PROPO 100 has a threshold slightly lower than the available pump power $P_o$.

Cavity 120 may be locked to pump source 130 (or visa-versa) by any suitable locking method. Typical methods include "peak-of-fringe" locking and "side-of-fringe" locking In a preferred embodiment, cavity 120 is locked to pump source 130 by "side-of-fringe locking." Side-of-fringe locking (also known as "power-locking") gives the added benefit of additional active noise suppression at low frequencies from the lock-loop.

With side-of-fringe locking the closer the pump frequency is to the center of the cavity resonance, the more power is coupled into the cavity, the less is reflected, and the more is generated. The coupled resonant power, reflected power, or (preferably) generated power is measured and compared with, e.g., subtracted from, a nominal target power. For example, to lock to a target generated power, the measured generated power is compared to a target power. This target power must be less than the power that would be generated if the pump frequency were at the center (peak) of the resonance. If the pump frequency is too far from the center of the resonance, then the result of subtraction will be negative. If the pump frequency is too close to the center of the resonance, then the result of subtraction will be positive. Therefore, this technique produces a signed error signal. Either the pump frequency or resonant cavity length may be adjusted in response to this signed error signal to force the signed error signal towards zero. This approach relies on the slope of generated (or resonant or reflected) power with respect to the detuning between the pump frequency and the cavity resonance frequency. This slope is typically non-zero on the side of the fringe.

Greater efficiency may be achieved by locking the pump laser to the peak of the cavity resonance (or visa-versa). In this case, there is zero slope for the coupled (or frequency converted or reflected) power with respect to cavity length (or pump laser frequency). Therefore, a signed error signal cannot be generated directly by subtracting the measured power and a target power. Several techniques exist for producing a useful error signal at the peak of a resonance. Currently, the most common is that of Drever and Hall [R. W. P. Drever, J. L. Hall, F. V. Kowalski, J. Hough, G. M. Ford, A. J. Munley and H Ward in Applied Physics B, Vol 31, page 97, (1983)], in which a phase modulation is imposed onto the incident pump radiation, and the reflected power off of the resonant cavity is used to derive a signed error signal at the peak of the resonance. This approach allows operation with nearly 100% coupling efficiency. Other techniques make use of polarization or dithering of the pump frequency so that it spans across the peak of the resonance.

3. Experimental Results

The inventors have conducted experiments to test the principle of pump noise suppression using OPO techniques. In the experiment a 1.5 watt single frequency laser was used as a source. The PROPO device used was designed for efficient production of output at 1600 nm. A 3% output coupling for the 1600 nm signal provided up to 500 mW of output and set the circulating pump power at approximately 20–25 watts. The threshold of the PROPO was less than 500 mW, implying operation at about three times over threshold. In this experiment, the parametric amplifier was a periodically poled lithium niobate (PPLN) crystal approximately 20 mm in length with a 29.75 μm poling period operated at a temperature of about 200° C. The ends of the crystal were anti-reflection coated.

The PROPO had no intentional output coupling for the 1064 nm pump light, but a leakage of about 0.05% through a high-reflecting mirror provided about 1 mW of noise suppressed pump for observation. The PROPO used a cavity built on a block of Invar. The PROPO cavity had an input coupler with 5% transmission, which approximately impedance matched the pump when the PROPO operated at about three times over threshold. The passive pump losses were not measured directly, but the total coating losses were estimated to be less than 1%. The observed slope efficiency indicated ηcoupling=0.7 and the device was operated at approximately twice the threshold (N=2). Using equations (3) and (13) the experimental parameters imply a noise suppression factor F=0.007 or approximately 21 dB. The relative intensity noise for incident pump radiation and the noise suppressed pump radiation were measured. The results are depicted in FIG. 5.

Figure 5:
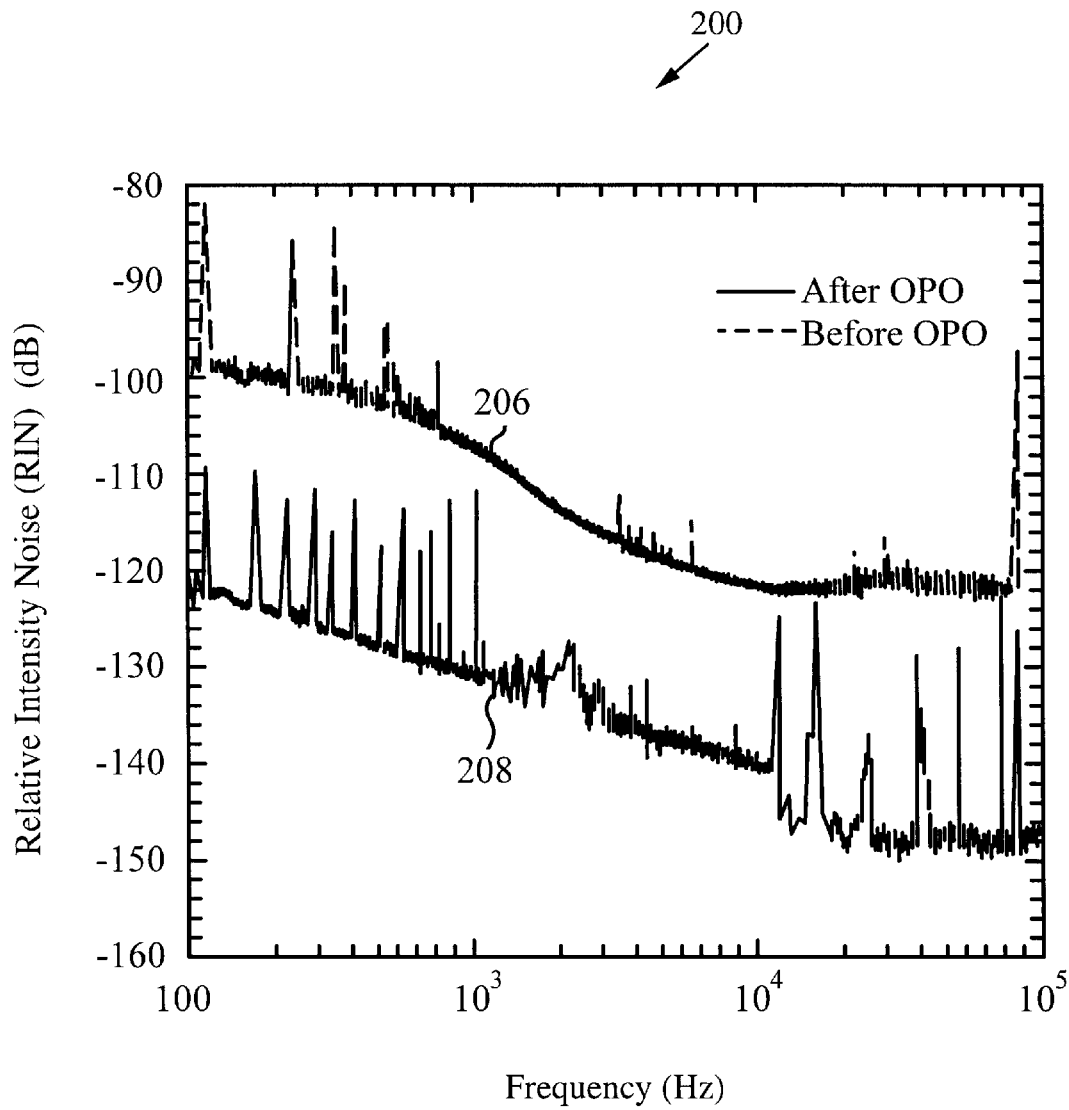
FIG. 5 depicts relative intensity noise spectra for an optical parametric oscillator according to embodiments of the present invention.

FIG. 5 shows a graph 200 of relative intensity noise (RIN) versus frequency for a high-power NPRO laser before and after noise suppression by the PROPO device having features in common with PROPO 100 of FIG. 4. A top spectrum 206 represents RIN incident on the PROPO. A lower spectrum 208 represents the RIN of the resonated pump power, measured before the PPLN gain crystal. Note that for no frequency is the post-OPO noise spectrum 208 higher than the pre-OPO noise spectrum 206.

FIG. 5 clearly demonstrates the capabilities of the PROPO noise suppression technique described above. The narrow noise spikes are associated with harmonics of the 60 Hz line frequency, and the switching power supply used in the un-packaged drive electronics supplying current to the laser diode in the NPRO. These narrow spikes are, therefore, not intrinsic to the PROPO. For frequencies above about 20 kHz, noise suppression of about 20 dB is observed, which is quite consistent with the predicted 19 dB noise suppression. This 20 dB value is expected to continue to frequencies as high as about 100 MHz.

The broad noise features near 1–10 kHz are the result of acoustic pickup from the noisy laboratory environment. This noise may also be related to the simple locking electronics used to control the PROPO cavity length. Finally, for frequencies below 1 kHz, the degree of noise suppression is closer to 25 dB. This is the case because the locking electronics were designed to stabilize the generated 1600 nm power, which also results in stabilization of the resonated pump power.

4. Suppression of Signal Noise

Figure 6:
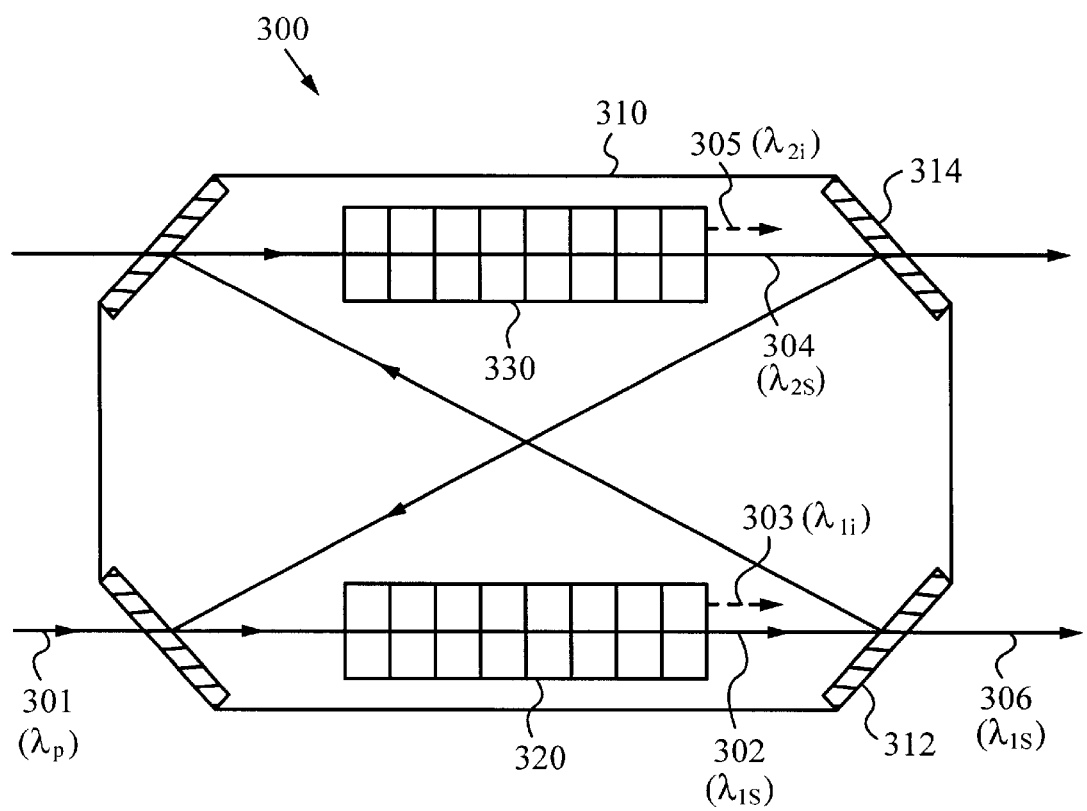
FIG. 6 depicts an optical parametric oscillator according to a third embodiment of the present invention.

The noise suppression technique described above can be extended to suppress noise on the signal. For example, FIG. 6 depicts a noise suppressed OPO 300 according to an alternative embodiment of the invention. OPO 300 generally comprises a cavity 310 a first parametric amplifier 320, and a second parametric amplifier 330 disposed within cavity 310. OPO 300 may be either a pump resonant or single pass pump OPO. Cavity 310 can be any type of optical cavity as described above with respect to cavity 120 of FIG. 1.

Parametric amplifiers 320, 330 may be nonlinear devices as described above. First parametric amplifier 320 interacts with incident pump radiation 301 having wavelength $\lambda_p$ to produce a first signal radiation 302 and a first idler radiation 303. Cavity 310 has a beam path length chosen such that cavity 310 resonates at a wavelength $\lambda_{1s}$ of first signal radiation 302. Cavity, 310 generally also resonates at pump wavelength $\lambda_p$, although this need not be the case. Cavity 310 has an output coupler 312 with a fixed output coupling $T_{1s}$ that allows an output signal radiation 306 at $\lambda_{1s}$ to exit cavity 310.

Signal radiation 302 acts as a pump for second parametric amplifier 330. Second parametric amplifier 330 interacts with first signal radiation 302 to produce a second signal radiation 304 and a second idler radiation 305. Cavity 320 also resonates at a wavelength $\lambda_{2s}$ of second signal radiation 304. Cavity 310 may have a second output coupler 314 that transmits part of the second signal radiation 304 and second idler radiation 305. Noise on first signal radiation 302 couples directly to second signal radiation 304 and second idler radiation 305. If the output coupling of first signal 302 and the threshold of second parametric amplifier 330 are set appropriately, an output signal 306 at $\lambda_{1s}$ will have reduced noise. Noise on pump radiation 301 can thus be transferred to second signal 304 and second idler 305 by second parametric amplifier 330 so that first signal radiation 302 has less noise.

In the embodiment shown in FIG. 6, the beam paths in cavity 310 for first signal radiation 302 and second signal radiation 304 are substantially the same so that they overlap at first parametric amplifier 320 and second parametric amplifier 330. Alternatively, two separate cavities may be used, a first cavity to resonate the first signal radiation, and a second to resonate the second signal radiation. In such a case, the beam paths of the two cavities need only overlap at the second parametric amplifier 330. In the embodiment shown in FIG. 6, cavity 310 serves as both the first and second cavities.

Noise reduction of output signal radiation 306 may be optimized in a manner similar to that set forth above with respect to FIG. 4. Specifically, first signal radiation 302 is highly resonated, i.e., it has low loss and low output coupling.

The criteria for optimizing noise reduction are similar to those described above with respect to FIG. 1. Specifically:

1) Minimize losses $\alpha_{s1}$ at the first wavelength.
2) If high noise suppressed output power is desired, set the output coupling of the first signal equal to about 1–2 times the passive losses ($T_{s1}=\alpha_{s1}$). If the greatest noise suppression is desired then set $T_{s1}<\alpha_{s1}$.
3) Operate second parametric amplifier 330 slightly above threshold. For example, the ratio N of first signal power to the threshold of parametric amplifier 330 is typically greater than about 1.0 and less than about 2.0, and preferably greater than about 1.0 and less than about 1.1. To accomplish this, one may set the output coupling at the second signal wavelength $\lambda_{s2}$, and the gain of second parametric amplifier 330, so that PROPO 300 has a threshold slightly lower than the available power at the first signal.

Depending on the application, the response time of cavity 310 may or may not be a limitation on noise reduction. Second parametric amplifier 330 typically responds on time scales comparable to or longer than the cavity lifetime of first signal radiation 302 (typically a few nanoseconds). However, if pump light 302 is resonant, faster noise will be integrated by cavity 310. Hence, if cavity lifetimes of pump radiation 302 and first signal radiation 302 are similar, noise reduction may be completely broadband.

Therefore, 10–20 dB or greater reduction in noise may be achieved with the above optical techniques, without much loss of power. If the second parametric amplifier 330 operates just above threshold, very little power is lost to it, and most of first signal radiation 302 is obtained through output coupler 312. Electronic feedback noise suppression techniques may further, and independently, reduce optical noise. Such an approach may lead, for example, to a 1 micron pumped, 1.5 micron OPO that can achieve shot-noise-limited stability over a wide frequency range. The same approach will also work for a standard ring laser with an intra-cavity OPO. The ring laser, e.g. a Nd:YAG, lases at a single frequency with relatively small output coupling. When the intra-cavity intensity rises to the threshold for pumping the OPO, the output power is effectively nearly clamped as additional power preferentially couples to the OPO rather than the output coupler.

Figure 7:
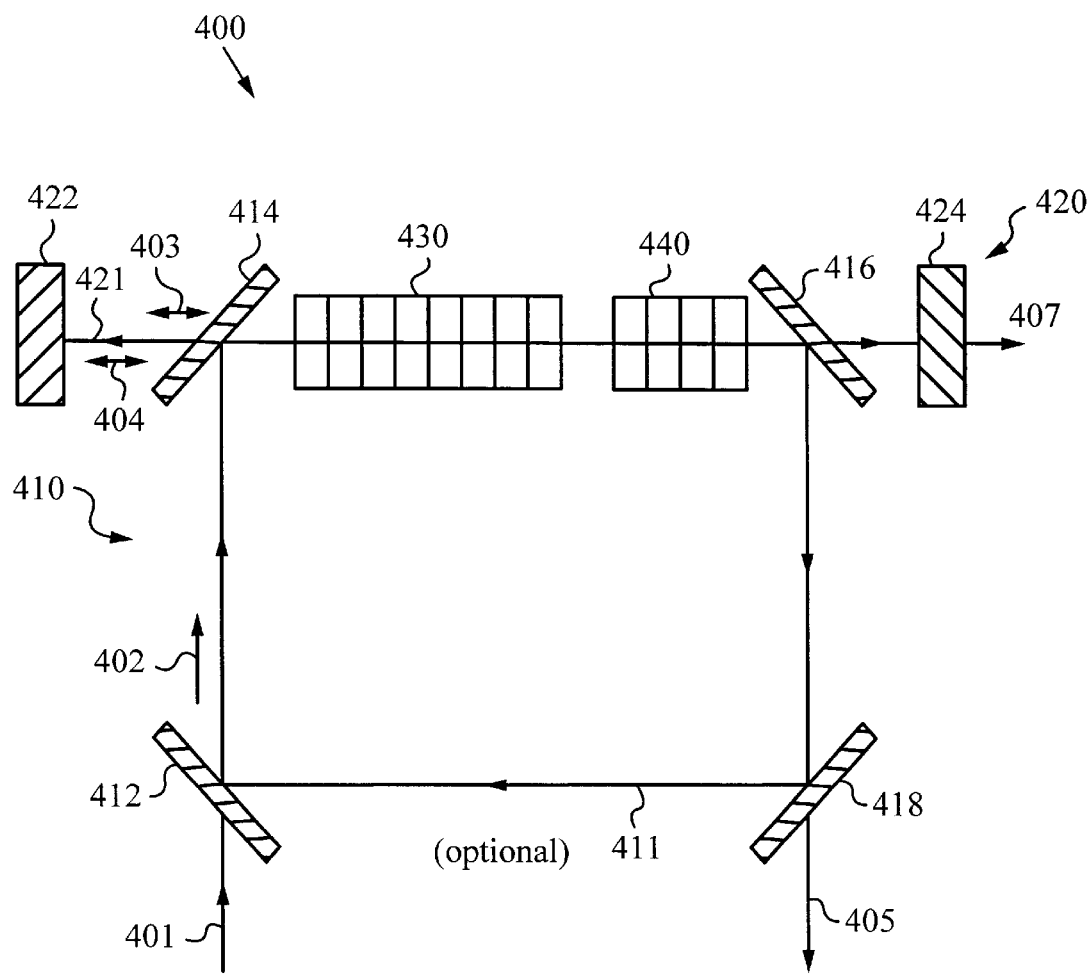
FIG. 7 depicts an optical parametric oscillator according to a fourth embodiment of the present invention.

Other variations on the basic OPO designs described above with respect to FIG. 4 and FIG. 6 are possible without departing from the scope of the present invention. For example, FIG. 7 depicts a PROPO according to yet another embodiment of the present invention. The PROPO 400 generally comprises a first resonant cavity 410 and a second resonant cavity 420. Resonant cavities 410 and 420 have beam paths 411, 421 that overlap along at least a portion of their respective path lengths. Specifically, beam paths 411, 421 overlap at a parametric amplifier 430. Parametric amplifier 430 typically includes a nonlinear medium as described above with respect to FIG. 4 and FIG. 6. The configuration of PROPO 400 allows independent tuning of cavities 410, 420 to resonate pump and signal radiation.

PROPO 400 receives incident pump radiation 401, e.g. via a partially transmitting mirror such as mirror 412, which serves as an input coupler. Pump radiation 401 is typically in the form of coherent light characterized by a pump wavelength $\lambda_p$. A total length of beam path 411 is chosen such that first cavity 410 resonates pump radiation 401 of wavelength $\lambda_p$. A portion of incident pump radiation 401 resonates within cavity 410 and is referred to as resonant pump radiation 402. A portion of resonant pump radiation 402 interacts with parametric amplifier 430 to produce signal radiation 403 of signal wavelength $\lambda_s$ and an idler radiation 404 of wavelength $\lambda_i$. A total length of beam path 421 is chosen such that second cavity 420 resonates signal radiation 403 of wavelength $\lambda_s$s.

Resonant cavities 410 and 420 typically comprise two or more mirrors. Cavities 410 and 420 may be of any conventional design, including Fabry-Perot, triangle, ring, bowtie, etc. For example, cavity 410 comprises a ring cavity having four mirrors 412, 414, 416, 418. Cavity 420 may comprise a Fabry-Perot cavity having two mirrors 422 and 424. Mirrors 414 and 416 are disposed between mirrors 422 and 424 such that beam paths 411 and 421 overlap. In the embodiment depicted in FIG. 7, parametric amplifier 430 is disposed between mirrors 414 and 416 where beam paths 411 and 421 overlap. To facilitate the overlap of pump radiation 401 and signal radiation 403, mirrors 414 and 416 may be designed to have a maximum reflectance at $\lambda_p$ and a maximum transmission at $\lambda_s$. Mirrors 422, 424 may have a maximum reflectance at $\lambda_s$.

A portion of resonant pump radiation 402 may exit PROPO 400 as output pump radiation 405, e.g. via a partially transmitting mirror 418, which serves as a pump output coupler. Similarly, a portion of signal radiation 403 may exit cavity 420 as an output signal radiation 407 via a partially transmitting mirror 424, which serves as a signal output coupler.

The operation and optimization of PROPO 400 for the purpose of noise suppression are analagous to that described above of with respect PROPO 100 of FIG. 4. Furthermore, a second parametric amplifier 440 may optionally be included in PROPO 400. In such a case PROPO 400 suppresses noise on a signal radiation produced by interaction of pump radition 401 with second parametric amplifier 440 as described above with respect to FIG. 6.

It will be clear to one skilled in the art that the above embodiments may be altered in many ways without departing from the scope of the invention. Accordingly, the scope of the invention should be determined by the following claims and their legal equivalents.

What is claimed is:

1. A pump resonant optical parametric oscillator comprising:

a) a pump resonant cavity having a first path having a length selected to resonate radiation having a pump wavelength $\lambda_p$;

b) a signal resonant cavity having a second path having a length selected to resonate radiation having a signal wavelength $\lambda_s$, wherein the signal resonant cavity has a total loss at the signal wavelength of $\gamma_S$;

c) an input coupler coupled to the pump resonant cavity, the input coupler having a transmission $T_{IC}$ at the pump wavelength $\lambda_p$;

d) a first output coupler coupled to the pump resonant cavity, the first output coupler having a transmission $T_P$ at the pump wavelength $\lambda_p$;

e) a parametric amplifier disposed within at least one of the pump resonant cavity and the signal resonant cavity, the parametric amplifier having a gain G at the signal wavelength $\lambda_s$, wherein the gain G increases with increasing power at the pump wavelength $\lambda_p$;

wherein $T_{IC}$, $T_P$, and G are chosen such that a resonated power at the pump wavelength $\lambda_p$ is nearly clamped at a threshold level, whereby a noise suppression at the pump wavelength $\lambda_p$ is greater than about 3 dB.

2. The oscillator of claim 1, wherein the pump resonant cavity has a round-trip power loss at the pump wavelength $\lambda_p$ that is dominated by the transmission $T_P$ of the output coupler.

3. The oscillator of claim 1, wherein the transmission $T_P$ of the output coupler is approximately equal to a total passive loss $\alpha_P$.

4. The oscillator of claim 3, wherein the transmission $T_{IC}$ of the input coupler is approximately equal to $T_P+\alpha_P$.

5. The oscillator of claim 3, wherein $T_{IC}$, $T_P$ and $\alpha_P$ are chosen such that, at the threshold level, a resonant pump power $P_P$ is enhanced by a factor $E=P_P/P_{thresh}$, where $P_{thresh}$ is a threshold power of the parametric amplifier and $E \geq 10$.

6. The oscillator of claim 1, wherein $\gamma_s$ and G are chosen such that a ratio N of an input pump power $P_o$ to the threshold level is close to about 1.0 but not so close that fluctuations in the incident pump power dip below the threshold level.

7. The oscillator of claim 6, wherein N is between about 1.0 and about 2.0.

8. The oscillator of claim 1, wherein at least one of the pump resonant cavity and the signal resonant cavity is a ring cavity.

9. The oscillator of claim 1, wherein at least one of the pump resonant cavity and the signal resonant cavity rejects noise at the pump wavelength $\lambda_p$.

10. The oscillator of claim 1, wherein a total passive loss $\alpha_p$ is less than about 5%.

11. The oscillator of claim 1, wherein the parametric amplifier includes a nonlinear medium.

12. The oscillator of claim 11, wherein the nonlinear medium is a Raman active medium, a Brillouin active medium or a four-wave mixing medium.

13. The oscillator of claim 11, wherein the nonlinear medium is chosen from the group consisting of Lithium Niobate ($LiNbO_3$), Lithium Tantalate ($LiTaO_3$), Lithium Borate ($LiBO_3$), periodically poled Lithium Niobate (PPLN), periodically poled Lithium Tantalate (PPLT), MgO:PPLN, KTP, PPKTP, RTA, BBO, and PPRTA.

14. An optical parametric oscillator comprising:
   a) a first resonant cavity, having a first path having a length selected to resonate radiation at a first signal wavelength $\lambda_{1s}$;
   b) a second resonant cavity, having a second path having a length selected to resonate radiation at a second signal wavelength $\lambda_S$, wherein at least a part of the second path overlaps at least a part of the first path;
   c) a first parametric amplifier disposed within the first resonant cavity for producing a first signal and a first idler in response to a pump radiation;
   d) a second parametric amplifier disposed within the second resonant cavity at a location where the first path and the second path overlap, whereby the first signal acts as a pump for the second parametric amplifier, whereby the second parametric amplifier produces a second signal and a second idler, and whereby noise on the first signal couples to the second signal and the second idler, thereby reducing noise on the first signal;
   e) an input coupler coupled to the first resonant cavity, the input coupler having a transmission $T_{IC}$ at the pump wavelength $\lambda_p$;
   f) an output coupler coupled to at least one of the first resonant cavity and the second resonant cavity, the output coupler having a transmission $T_{1s}$ at the first signal wavelength $\lambda_{1s}$;
wherein $T_{IC}$, $T_{1s}$ are chosen such that the first signal at the first signal wavelength $\lambda_{1s}$ is nearly clamped at a threshold level.

15. The oscillator of claim 14, wherein the first resonant cavity and the first parametric amplifier form a singly resonant optical parametric oscillator.

16. The oscillator of claim 15, wherein the first optical parametric oscillator is a pump resonant optical parametric oscillator.

17. The oscillator of claim 15, wherein the first optical parametric oscillator is a single pass pump optical parametric oscillator.

18. The oscillator of claim 14, wherein the second resonant cavity and the second parametric amplifier form a singly resonant optical parametric oscillator.

19. The oscillator of claim 14, wherein a power of radiation having the first signal wavelength incident on the second parametric amplifier exceeds a threshold level of the second parametric amplifier, whereby the second parametric amplifier suppresses noise at the first signal wavelength.

20. A method for suppressing noise in optical pump radiation comprising:
   a) resonantly coupling the pump radiation having a pump wavelength $\lambda_p$ to an optical parametric oscillator having a resonant cavity containing a parametric amplifier;
   b) interacting the pump radiation with the parametric amplifier to produce a signal radiation having a signal wavelength $\lambda_s$ and an idler wavelength $\lambda_i$;
   c) setting an output coupling $T_S$ of the pump radiation, and a gain G of the parametric amplifier such that the optical parametric oscillator has a threshold slightly lower than the available power at a wavelength of the signal radiation, whereby noise on the pump radiation is transferred to the signal radiation;
wherein a noise suppression of the pump radiation is greater than about a factor of 10.

21. The method of claim 20, wherein the resonant cavity has a round-trip power loss at the pump wavelength $\lambda_p$ that is dominated by an output coupler transmission $T_p$.

22. The method of claim 20, wherein an output transmission $T_p$ is approximately equal to a total passive loss $\alpha_P$.

23. The method of claim 22, further comprising setting a transmission of an input coupler $T_{IC}$ to within a factor of about 2 of $T_p + \alpha_P$.

24. The method of claim 20, wherein $T_S$ and G are chosen such that a ratio N of an input pump power to the threshold level is between about 1.0 and about 2.0.

25. The method of claim 24, wherein N is between about 1.0 and about 1.1.

26. The method of claim 20, further comprising sampling the resonant pump radiation at a point immediately preceding the parametric amplifier.

27. The method of claim 20, further comprising locking a source of the pump radiation to the resonant cavity.

28. The method of claim 27, wherein the source is locked to the resonant cavity by a side-of-fringe locking technique.

29. The method of claim 27, wherein the source is locked to the resonant cavity by a peak-of-fringe locking technique.

30. The method of claim 20, further comprising locking the resonant cavity to a source of the pump radiation.

31. The method of claim 30, wherein the resonant cavity is locked to the source by a side-of-fringe locking technique.

32. The method of claim 30, wherein the resonant cavity is locked to the source by a peak-of-fringe locking technique.

33. A noise-suppressed optical parametric oscillator comprising:
   a) at least one resonant cavity having a path of a length selected to resonate a pump radiation and at least one signal radiation;
   b) at least one nonlinear medium having a gain G to the at least one signal radiation, the nonlinear medium being disposed within the resonant cavity, such that the pump radiation and the signal radiation overlap in the nonlinear medium;
   c) an input coupler coupled to the at least one resonant cavity for admitting the pump radiation at a pump wavelength $\lambda_p$, the input coupler having a transmission $T_{IC}$ at the pump wavelength $\lambda_p$;
   d) an output coupler coupled to the at least one resonant cavity, the output coupler having a transmission $T_P$ at the pump wavelength $\lambda_p$;
wherein $T_{IC}$, $T_P$, and G are chosen such that a resonated power at the pump wavelength $\lambda_p$ is nearly clamped at a threshold level, whereby a noise suppression at the pump wavelength $\lambda_p$ is achieved.

34. The noise-suppressed optical parametric oscillator of claim 33, wherein the nonlinear medium comprises a nonlinear crystal, a Raman active medium or a Brillouin active medium.

35. The noise-suppressed optical parametric oscillator of claim 33, wherein the pump radiation incident on the oscillator is delivered from a source emitting a power between 1.01 and 2 times the threshold power.

36. The noise-suppressed optical parametric oscillator of claim 33, wherein the at least one resonant cavity comprises a ring cavity.

* * * * *